(12) United States Patent
Samaniego et al.

(10) Patent No.: US 11,987,279 B2
(45) Date of Patent: May 21, 2024

(54) SINGLE USER LOADER

(71) Applicant: International Business Machines Corporation, Armonk, NY (US)

(72) Inventors: Paul Samaniego, Port Ewen, NY (US); Oswald J. Mantilla, Dutchess, NY (US); Jeannette Bender, Highland, NY (US)

(73) Assignee: International Business Machines Corporation, Armonk, NY (US)

( * ) Notice: Subject to any disclaimer, the term of this patent is extended or adjusted under 35 U.S.C. 154(b) by 462 days.

(21) Appl. No.: 17/373,843

(22) Filed: Jul. 13, 2021

(65) Prior Publication Data

US 2023/0013154 A1 Jan. 19, 2023

(51) Int. Cl.
*B62B 3/00* (2006.01)
*B62B 5/00* (2006.01)

(52) U.S. Cl.
CPC .............. *B62B 3/00* (2013.01); *B62B 5/0003* (2013.01); *B62B 2202/10* (2013.01); *B62B 2501/00* (2013.01)

(58) Field of Classification Search
CPC ..... B62B 3/00; B62B 5/0003; B62B 2202/10; B62B 2501/00
See application file for complete search history.

(56) References Cited

U.S. PATENT DOCUMENTS

| | | | |
|---|---|---|---|
| 3,498,403 A | 3/1970 | Kohls | |
| 4,288,195 A | 9/1981 | Brewer | |
| 5,730,577 A | 3/1998 | Jones | |
| 7,188,843 B2 | 3/2007 | Magness | |
| 7,354,236 B1 | 4/2008 | Springer | |
| 8,052,120 B2 | 11/2011 | Bacon | |
| 8,286,942 B2 | 10/2012 | Thesier | |
| 8,651,501 B1* | 2/2014 | Davis | B62B 5/0086 |
| | | | 254/133 R |
| 8,991,626 B2 | 3/2015 | Crain et al. | |
| 9,248,065 B1* | 2/2016 | Tu | A61G 7/1046 |
| 9,540,220 B2* | 1/2017 | Stewart | B66F 7/0625 |
| 9,707,880 B2* | 7/2017 | Ochenkowski | B60P 3/07 |
| 9,815,672 B2* | 11/2017 | Baudermann | B66F 17/00 |

(Continued)

FOREIGN PATENT DOCUMENTS

| | | |
|---|---|---|
| CN | 1942377 A | 4/2007 |
| CN | 106477483 A | 3/2017 |

(Continued)

OTHER PUBLICATIONS

International Search Report; International Application No. PCT/CN2022/089275; International Filing Date: Apr. 26, 2022; Date of mailing: Jul. 28, 2022; 10 pages.

(Continued)

*Primary Examiner* — Saul Rodriguez
*Assistant Examiner* — Ashley K Romano
(74) *Attorney, Agent, or Firm* — CANTOR COLBURN LLP; Tihon Poltavets

(57) ABSTRACT

Embodiments for a single user truck loader. A platform is configured to receive placement of a load. Wheels are disposed at locations of the platform. A dolly mechanism is disposed in a cavity formed in the platform. Sidewalls of the platform house the cavity. The cavity of the platform is configured to receive a lift deck of a lifting mechanism.

18 Claims, 15 Drawing Sheets

(56) References Cited

U.S. PATENT DOCUMENTS

| | | | |
|---|---|---|---|
| 10,023,214 B2 * | 7/2018 | Stewart | B60P 1/6427 |
| 10,112,519 B2 | 10/2018 | Piercey, III | |
| 10,173,574 B2 * | 1/2019 | Ochenkowski | B60P 1/4492 |
| 10,813,815 B2 * | 10/2020 | Hruschka | A61G 7/005 |
| 11,440,752 B2 * | 9/2022 | Eidsmore | B60P 1/02 |
| 2007/0140819 A1 | 6/2007 | Piveteau | |
| 2009/0272953 A1 | 11/2009 | Wolf | |
| 2011/0262261 A1 | 10/2011 | George et al. | |
| 2016/0060084 A1 | 3/2016 | Baudermann | |

FOREIGN PATENT DOCUMENTS

| | | |
|---|---|---|
| CN | 108706502 A | 10/2018 |
| WO | 2017036956 A1 | 3/2017 |

OTHER PUBLICATIONS

Anonymous, "Jet Truck Loader," Tech Mech Handling Equipments, URL: https://www.palletandstacker.com/truck-loader.html, Retrieved: Dec. 27, 2023, 2 pages.

* cited by examiner

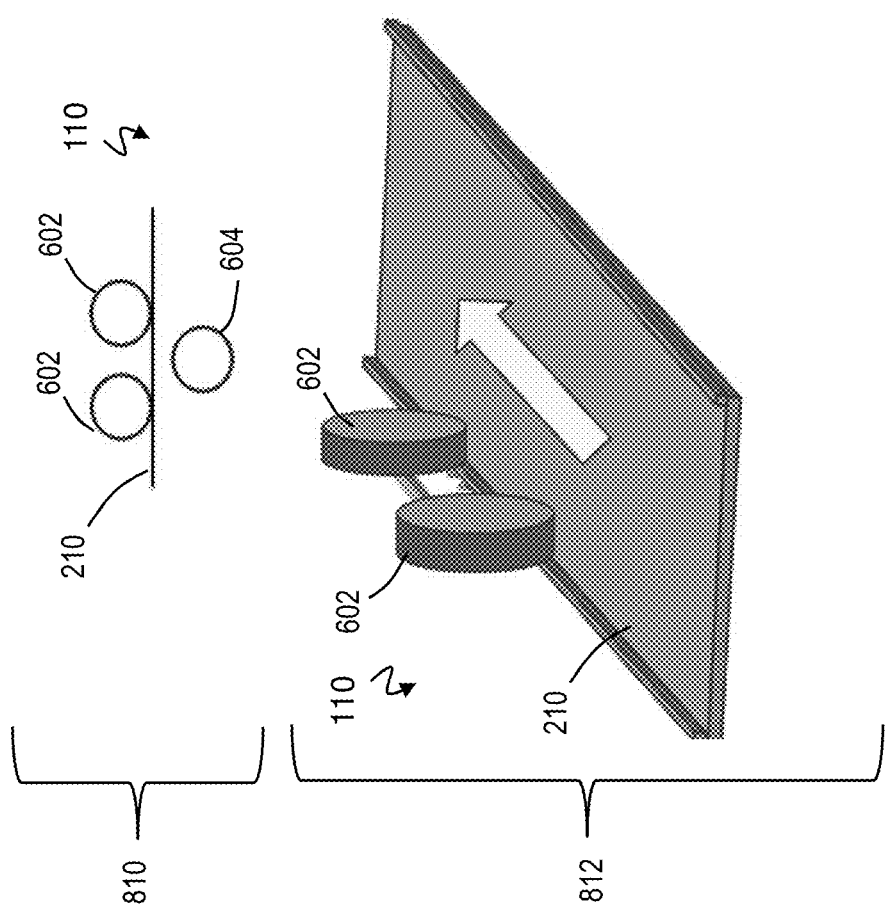

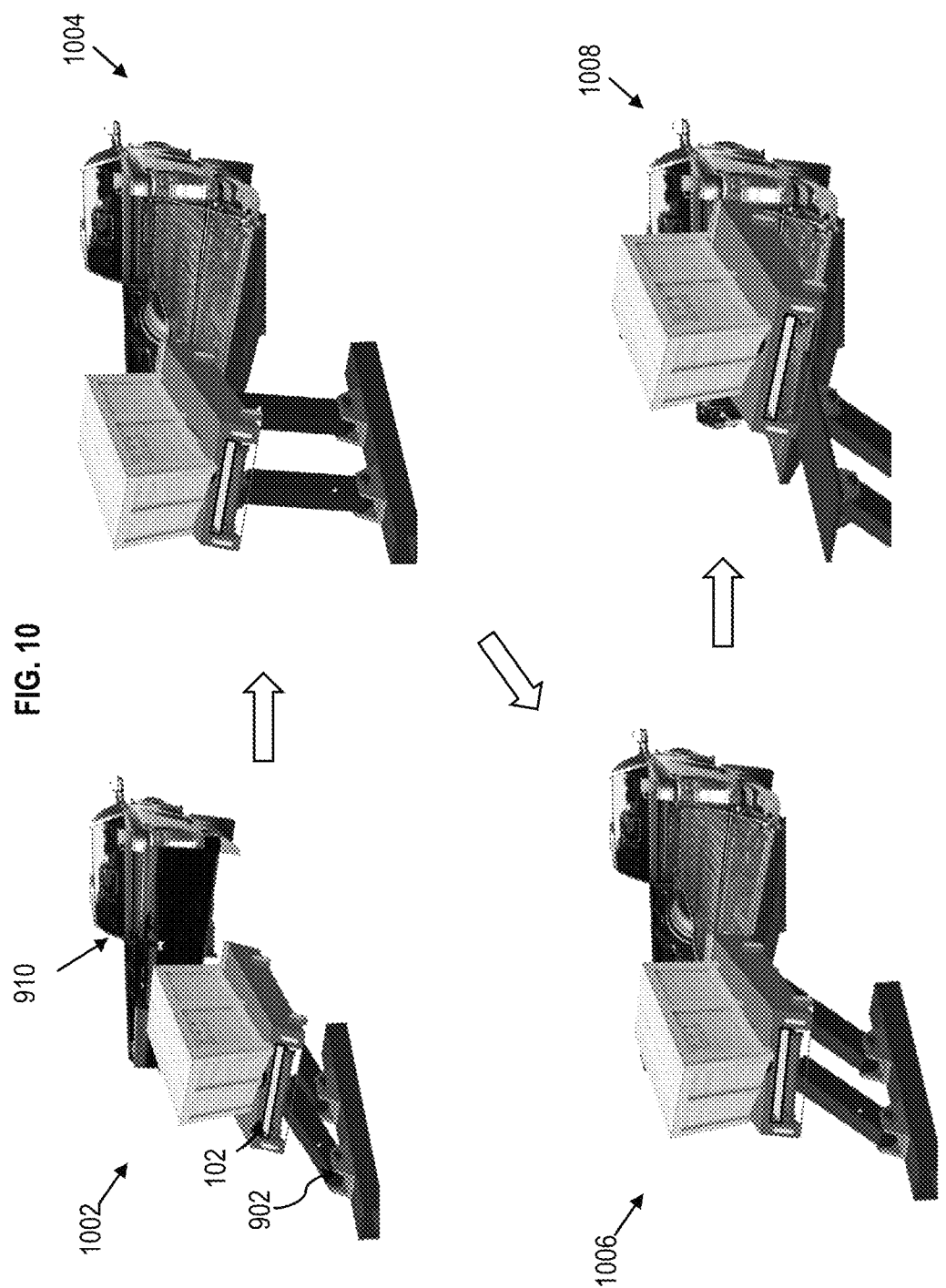

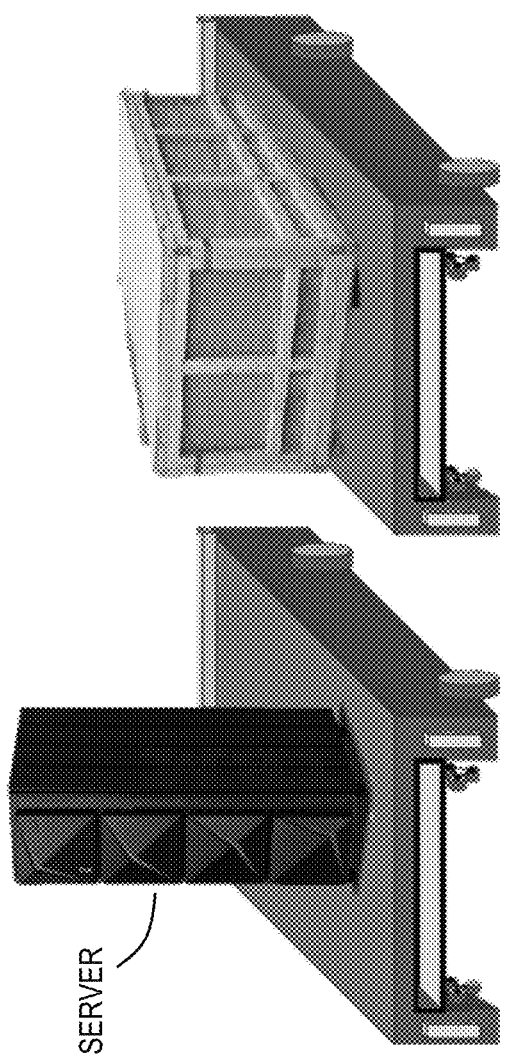

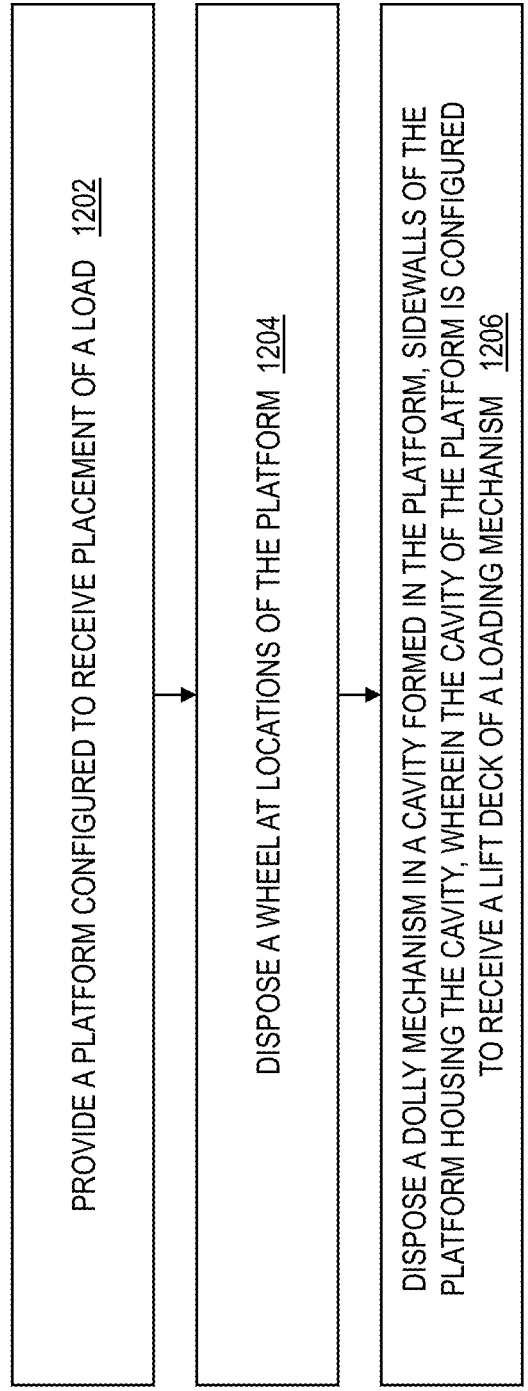

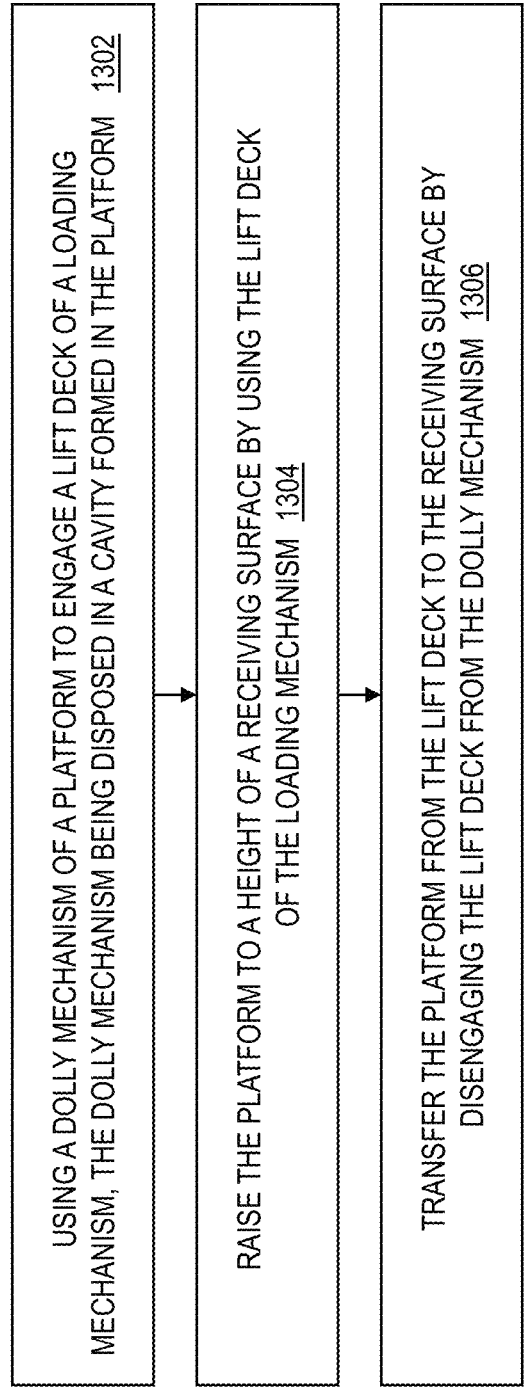

SINGLE USER LOADER

BACKGROUND

The present invention generally relates to a loader apparatus, and more specifically, to apparatuses and methods for a single user loader.

A lifting mechanism can be utilized to assist a user with a heavy load, and there are many types of lifting mechanisms. A pallet jack, also known as a pallet truck, pallet pump, pump truck, scooter, dog, or jigger is a tool used to lift and move pallets. Pallet jacks are the most basic form of a forklift and are intended to move pallets within a warehouse. A forklift, also called lift truck, jitney, fork truck, fork hoist, and forklift truck, is a powered industrial truck used to lift and move materials over short distances.

A lift table is a device that may employ a scissors mechanism to raise or lower goods and/or a person. Typically lift tables are used to raise large, heavy loads through relatively small distances. Common applications include pallet handling, vehicle loading, and work positioning. Lift tables can be made in a vast array of configurations and can be built to suit various highly specialized industrial processes. The most common lift table design incorporates hydraulic cylinders and an electrically powered pump to actuate the scissor lifting mechanism. Lift tables can also be driven by pneumatic sources, trapezoidal-threaded screw drives, push chains or by hydraulic foot pump when the load is not heavy.

SUMMARY

Embodiments of the present invention are directed to an apparatus for a single user truck loader. A non-limiting example apparatus includes a platform configured to receive placement of a load, wheels disposed at locations of the platform, and a dolly mechanism disposed in a cavity formed in the platform. Sidewalls of the platform house the cavity. The cavity of the platform is configured to receive a lift deck of a lifting mechanism.

Embodiments of the present invention are directed to method. A non-limiting example of the method includes using a dolly mechanism of a platform to engage a lift deck of a lifting mechanism, the dolly mechanism being disposed in a cavity formed in the platform. The method includes raising the platform to a height of a receiving surface by using the lift deck of the lifting mechanism. Also, the method includes transferring the platform from the lift deck to the receiving surface by disengaging the lift deck from the dolly mechanism.

Other embodiments of the present invention implement features of the above-described apparatus as a method of configuring the apparatus.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIGS. 8A, 8B, and 8C depict an example scenario of a dolly mechanism interacting with a lift deck of a lift mechanism in accordance with one or more embodiments of the present invention;

FIG. 10 depicts examples views of loading the deck, using a lift deck, on a vehicle in accordance with one or more embodiments of the present invention;

FIG. 11 depicts examples loads or items positioned on the deck for loading on and unloading off a vehicle in accordance with one or more embodiments of the present invention;

FIG. 12 is a flowchart of a method for configuring an apparatus in accordance with one or more embodiments; and FIG. 13 is a flowchart of a method for using an apparatus in accordance with one or more embodiments of the present invention.

DETAILED DESCRIPTION

One or more embodiments of the present invention provide methods and apparatuses arranged and configured for providing a single user truck loader. A single user truck loader is designed to be used by a single person for moving and lifting a heavy load or item to be loaded and off loaded from the bed of a truck. The single user truck loader can include a deck for the item/load to be loaded and secured. A lift mechanism (e.g., a four-bar-linkage lift) having a left deck or table can raise the deck of the single user truck loader up to the level of the bed of a vehicle (e.g., a truck). The deck can then be pushed onto the bed of the truck and secured. Then, the lift can be lowered and stored under the deck of the single user truck loader.

In many situations, one person needs to load a large, heavy, awkward item (e.g., computer server) into a freight truck. Ramps have been used in the past but can be dangerous and difficult for one person to use for loading the item. A permanent tailgate lift can be expensive and limit the functionality of the truck.

In accordance with one or more embodiments of the invention, the single user truck loader can be utilized without the need of a permanent tailgate lift or structure attached to the truck, and without having ramps extending from the ground to the tailgate (or bed) of the truck. The deck may be on the flat ground where the item/load can be easily loaded and secured. In addition, a winch or come along can be used to move the object onto the deck if needed. In some cases, the deck can be 5.5 feet, 6.5 feet, 8 feet, etc., to accommodate the standard bed lengths. The deck of the single user truck loader can be an aluminum framework approximately 5.5 feet long and less than 48 inches wide in order to fit between the wheelbase of a standard truck. A clamp track (e.g., E-track or L-track) may be across the top on the front edge for wheel chocks and strapping points. A rear clamp track may be used be near the rear. The lift or lift mechanism (e.g., a four-bar linkage) could be activated by hydraulic pump or power screw to raise the deck of the single user truck loader to the level of the bed. The lift mechanism can be adjusted for different truck bed levels and should be easily compatible to be placed under the deck of the single user truck loader in the bed of the truck. Once raised to the height of the bed of the truck, the deck is transferred (e.g., pushed) from the lift mechanism to the bed. The deck may be secured to the lift mechanism by two large diameter pins. Once the pins are removed, the deck can slide in one direction off the lift and onto the truck bed. The deck may be secured to the bed of the truck with straps. The lift mechanism is compacted and/or dismantled and secured in a cavity under the deck.

Figure 1:
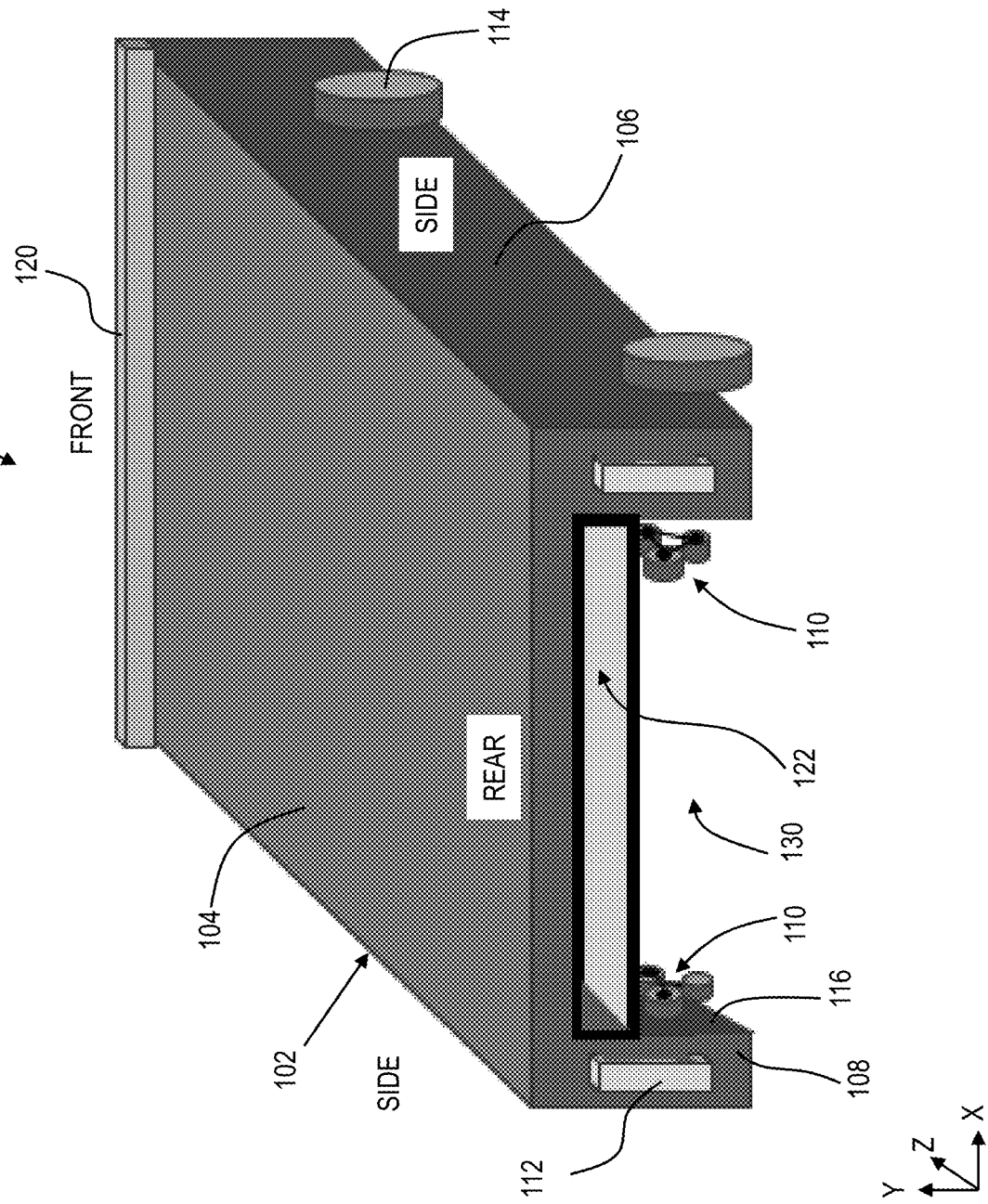
FIG. 1 depicts a perspective view of a single user truck loader in accordance with one or more embodiments of the present invention.

FIG. 1 is a perspective view of a single user truck loader 100 in accordance with one or more embodiments of the present invention. Single user truck loader 100 is configured to assist a (single) user with loading items on the bed of a truck, as well as unloading items of the truck. Single user truck loader 100 includes a deck or platform 102. Deck 102 includes a top plate 104 attached to sidewall plates 106. A rear plate 108 is attached to sidewall plates 106. Single user truck loader 100 also includes a front plate 502 depicted in FIG. 5. Top plate 104, rear plate 108, sidewall plates 106, and front plate 502 can be made of any suitable materials. Example materials for top plate 104, rear plate 108, sidewall plates 106, and front plate 502 (i.e., deck 102) can include metals, metal alloys, plastics, wood, etc., and various combination thereof as understood by one ordinary skill in the art. Some example materials may include steel, iron, aluminum, titanium, copper, nickel, etc., as well as any suitable material. To form the deck 102, top plate 104, rear plate 108, sidewall plates 106, and front plate 502 can be attached to each other using any standard techniques and assemblies as understood by one of ordinary skill in the art. Examples attachments and methods can include welding, brackets, screws, bolts, fasteners, pressing rivets, folding/tab joints, self-clinching (self-riveting), etc.

In one or more embodiments, sidewall plates 106 can be a thick material (or have a thickness) on which rear plates 108 are attached to the rear ends of sidewalls plates 106 and front plate 502 is attached to the front ends of sidewall plates 106. In one or more embodiments, inner sidewall plates 116 can also be attached to rear plates 108 and front plate 502. Inner sidewall plates 116 can be made of the same materials as (outer) sidewall plates 106 and attached in any manner discussed herein.

Wheels 114 are rotatably attached to the sidewall plates 106 using any suitable technique as understood by one of ordinary skill in the art. Wheels 114 can be attached using axles (not shown) that extend though sidewall plates 106 such that the wheels 114 rotate to move deck 102. Although use of four wheels 114 at the corners of deck 102 may be illustrated, it should be appreciated that more or fewer wheels can be utilized, in various placements. In one or more embodiments, top plate 104 can form a flange portion 202 (depicted in FIG. 2) that extends over the wheels 114, and this flange portion 202 provides greater surface area for a load placed on top of deck 102. A bumper edge 120 is attached at the front end of the deck 102. It should be appreciated that additional bumper edges (not shown) could be attached to the sides of deck 102.

Deck 102 may optionally include a ramp storage 122. Ramp storage 122 can be a box and/or compartment formed of any materials discussed herein for deck 102. Ramp storage 122 can be attached to the bottom side of top plate 104, the inner sides of sidewall plates 106, and/or inner sidewall plates 116. Ramp storage 122 can be attached to deck 102 using any attachments and techniques discussed herein, along with any suitable methods as understood by one or ordinary skill in the art.

Figure 4:
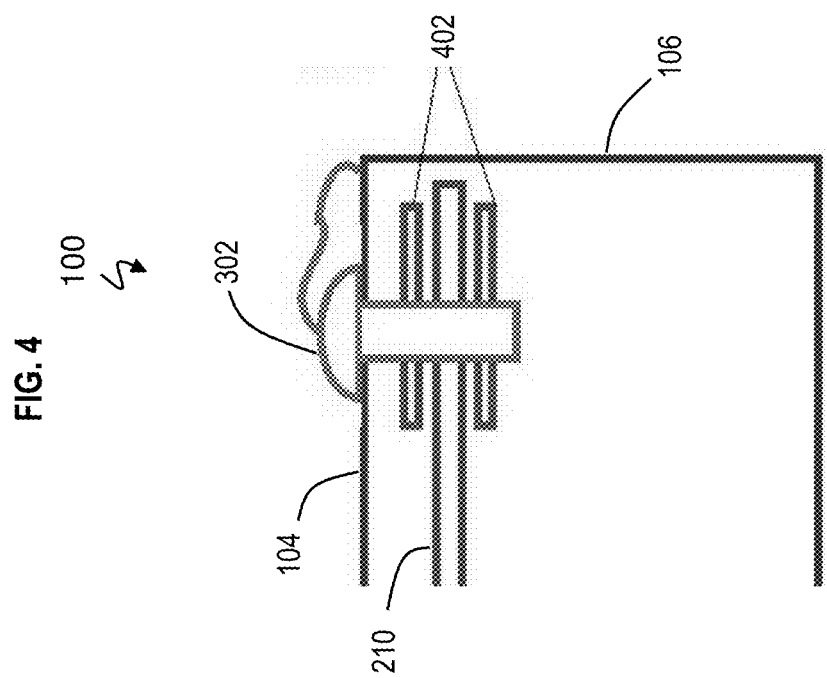
FIG. 4 depicts further details of a portion in FIG. 3 in accordance with one or more embodiments of the present invention.

Deck 102 includes a dolly mechanism 110 which is illustrated as a tri-dolly mechanism with three wheels separately attached to a support member. Although a tri-dolly mechanism may be discussed, it should be appreciated that dolly mechanism 110 is not meant to be limited to three wheels. In one or more embodiments, dolly mechanism 110 can include two, four, five, six, etc., wheels. Four dolly mechanisms 110 can be separately be attached to the inner surfaces of sidewall plates 106, using any standard attachments and techniques. In one or more embodiments, more or fewer than four dolly mechanisms 110 may be utilized. For example, six dolly mechanisms 110 may be utilized. As seen in FIG. 4, dolly mechanisms 110 are posited in a cavity 130. Cavity 130 is formed below top plate 104, between sidewall plates 106, and behind front plate 502 (depicted in FIG. 5).

Handles 112 may be attached to rear plate 108 using any suitable method. Handles 112 are shown on the sides of cavity 130 and storage 122. In one or more embodiments, one or more handles 112 can be horizontally positioned on a portion of rear plate 108 that is above cavity 130 and storage 122.

Figure 2:
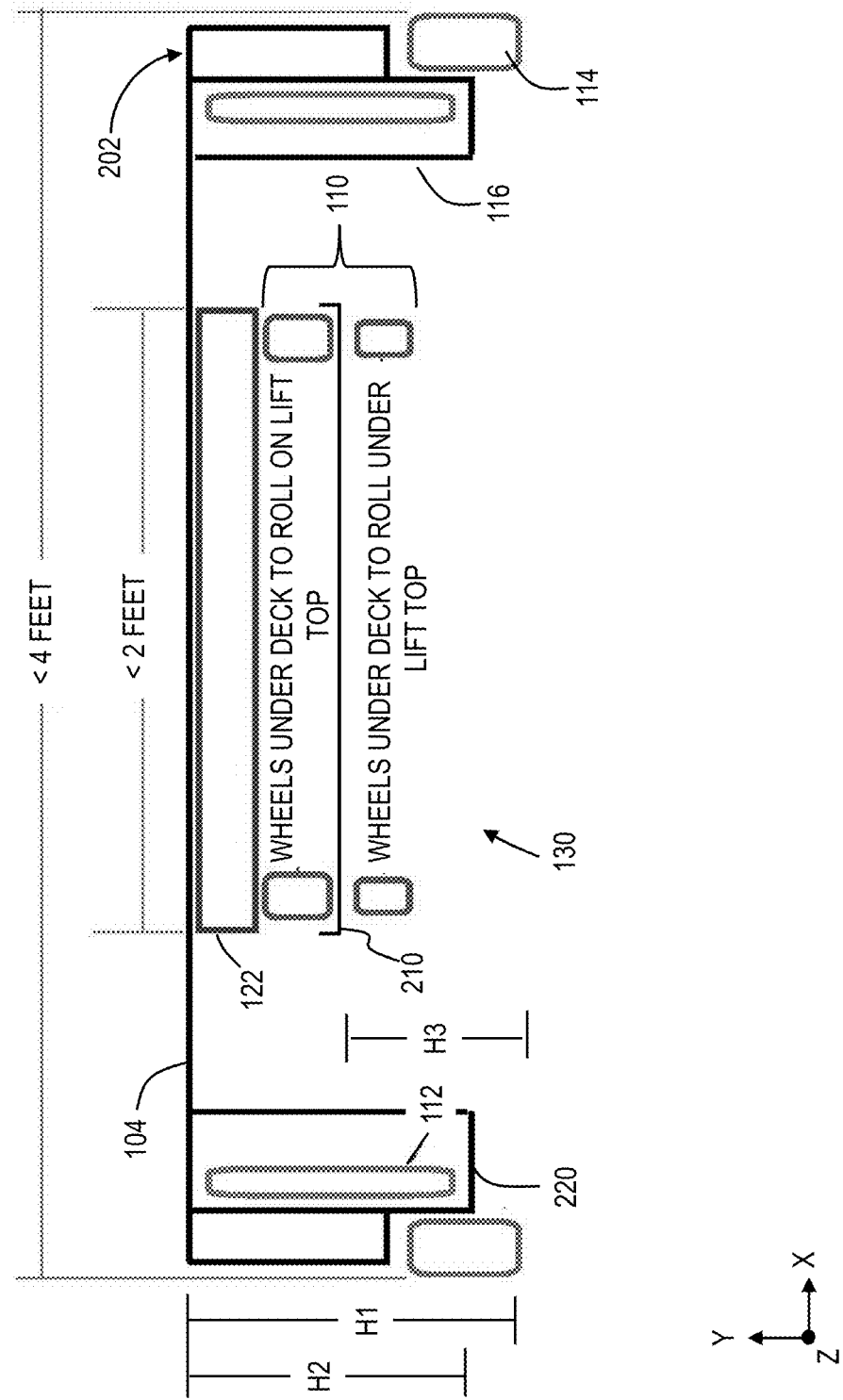
FIG. 2 depicts a block diagram of the single user truck loader in accordance with one or more embodiments of the present invention.

FIG. 2 is a block diagram of the single user truck loader 100 in accordance with one or more embodiments of the present invention. FIG. 2 depicts a simplified view as seen looking into the rear of truck loader 100. The width in the x-axis from wheel to wheel is less than about 4 feet in order to fit between the wheel walls of a standard pickup truck, in one or more embodiments. Accordingly, the width in the x-axis of the top plate 104 is less than about 4 feet. The width in the x-axis of the storage 122 is about or less than 2 feet. In the dolly mechanisms 110, some wheels are above a lift deck 210 of the lift mechanism and some wheels are below the lift deck 210 of the lift mechanism. More regarding lift mechanisms having lift deck 210 is discussed herein. In FIG. 2, the height H1 in the y-axis is the height from the top surface of top plate 104 to the bottom of wheels 114. Height H1 can range from about 8 inches to 12 inches. Height H2 in the y-axis is the height from the top surface of top plate 104 to the bottom surface/edge of sidewall plate 106 (when flange portion 202 is not present), to the bottom surface/edge of rear plate 108 (e.g., depicted in FIG. 1), to the bottom surface/edge of front plate 502 (e.g., depicted in FIG. 5), and/or to the bottom surface of a bottom plate 220. Height H2 can range from about 5 inches to 7 inches. Height H3 in the y-axis is the height from the bottom of upper wheels 602 (depicted in FIG. 6) to the bottom of wheels 114 and/or to the ground. Height H3 can range from about 4 inches to 7 inches.

Figure 3:
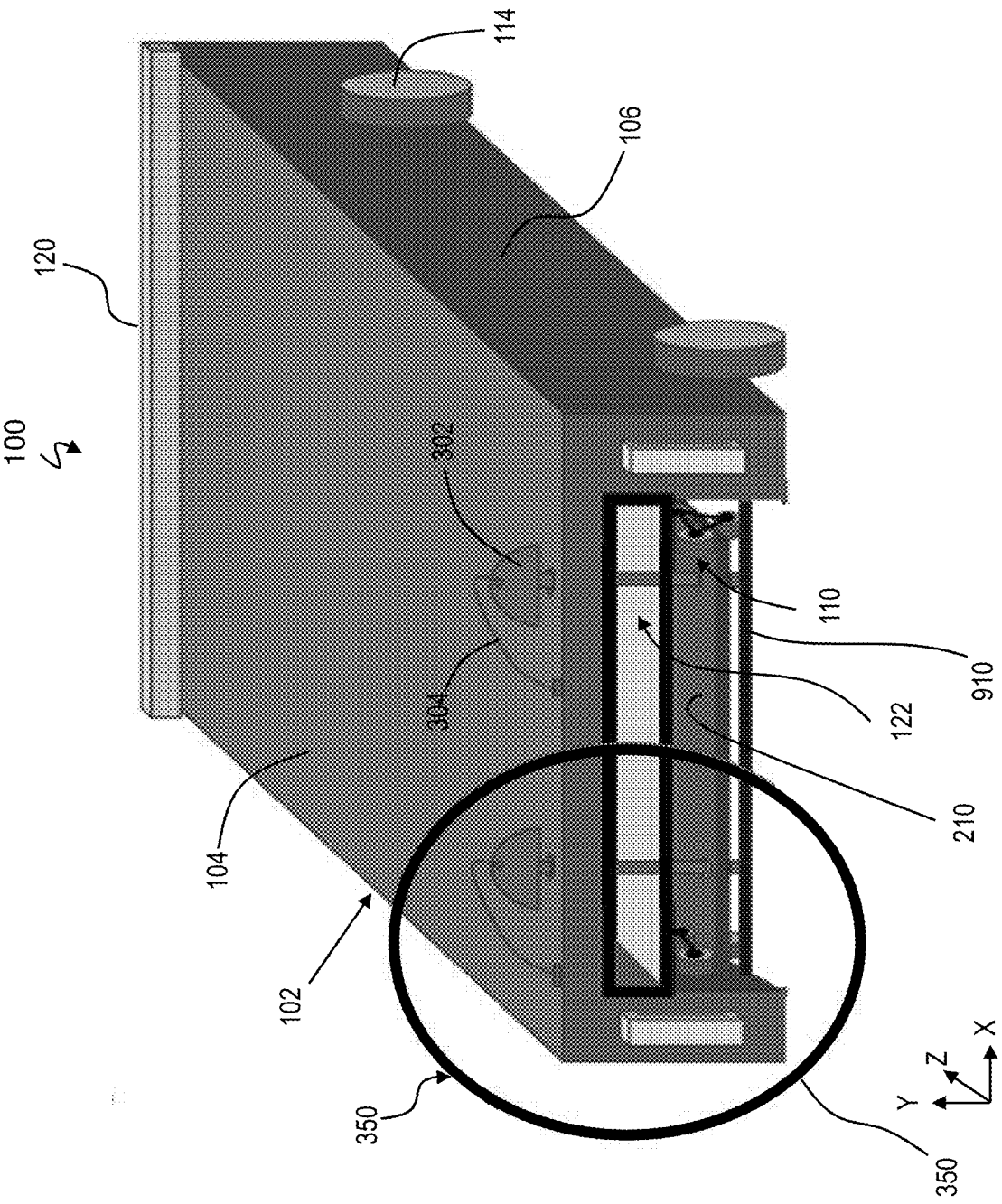
FIG. 3 depicts a perspective view of the single user truck loader in accordance with one or more embodiments of the present invention.

FIG. 3 is a perspective view of the single user truck loader 100 in accordance with one or more embodiments of the present invention. FIG. 3 illustrates that one or more pins 302 may be utilized to secure the lift deck 210 of the lift mechanism to the deck 102 during lifting and lowering, as well as to prevent items for sliding out of storage 122. A tether 304 may be utilized to secure each of the pins 302 to the surface of top plate 104. Pins 302 can be formed of any suitable material, including any material discussed herein for deck 102. Ramp storage 122 can have one or more holes to receive the one or more pins 302. Similarly, the lift deck 210 of the lift mechanism can have one or more corresponding holes aligned to receive the one or more pins 302, thereby securing the lift deck 210 of the lift mechanism in place. In one or more embodiments, ramp storage 122 can be recessed and/or offset from the edge of the rear of deck 102, such that the pins 302 extend down to the rear and/or outside the opening of ramp storage 122; in such case, no holes are needed in ramp storage 122. Similarly, in one or more embodiments, lift deck 210 of the lift mechanism can be pushed into cavity 130 such that pins 302 extend down to the rear and/or outside/beyond the lift deck 210 of the lift mechanism; in such case, no holes are needed in lift deck 210 of the lift mechanism because pins 302 act has a barrier to hold the lift deck 210 of the lift mechanism within the space between wheels 602 and wheel 604. In FIG. 3, a line or bar is a simplified representative of a base or foundation (e.g., base 904) of the lift mechanism, such as lift mechanism 902 depicted in FIG. 9. Pins 302 do not extend into the base 904 of lift mechanism 902.

A highlighted portion 350 is depicted in FIG. 3. FIG. 4 depicts further details of the highlighted portion 350 in accordance with one or more embodiments of the present invention. In FIG. 4, securing plates 402 can be used to further secure or hold the lift deck 210 of the lift mechanism and prevent movement. Each of the securing plates 402 (e.g., top securing plate and bottom securing plate) have holes aligned to receive the pins 302. FIG. 4 shows the securing plates 402 to explain the sandwiching of the lift deck/plate 210 between two securing plates 402. Securing plates 402 can be steal L-shaped brackets that form a channel for the lift deck 210 to pass between. FIG. 3 shows the pins 302 near the rear to illustrate their use but would really be located behind the first pair of dollies as the lift's plate (210) would be (basically) horizontal.

Figure 5:
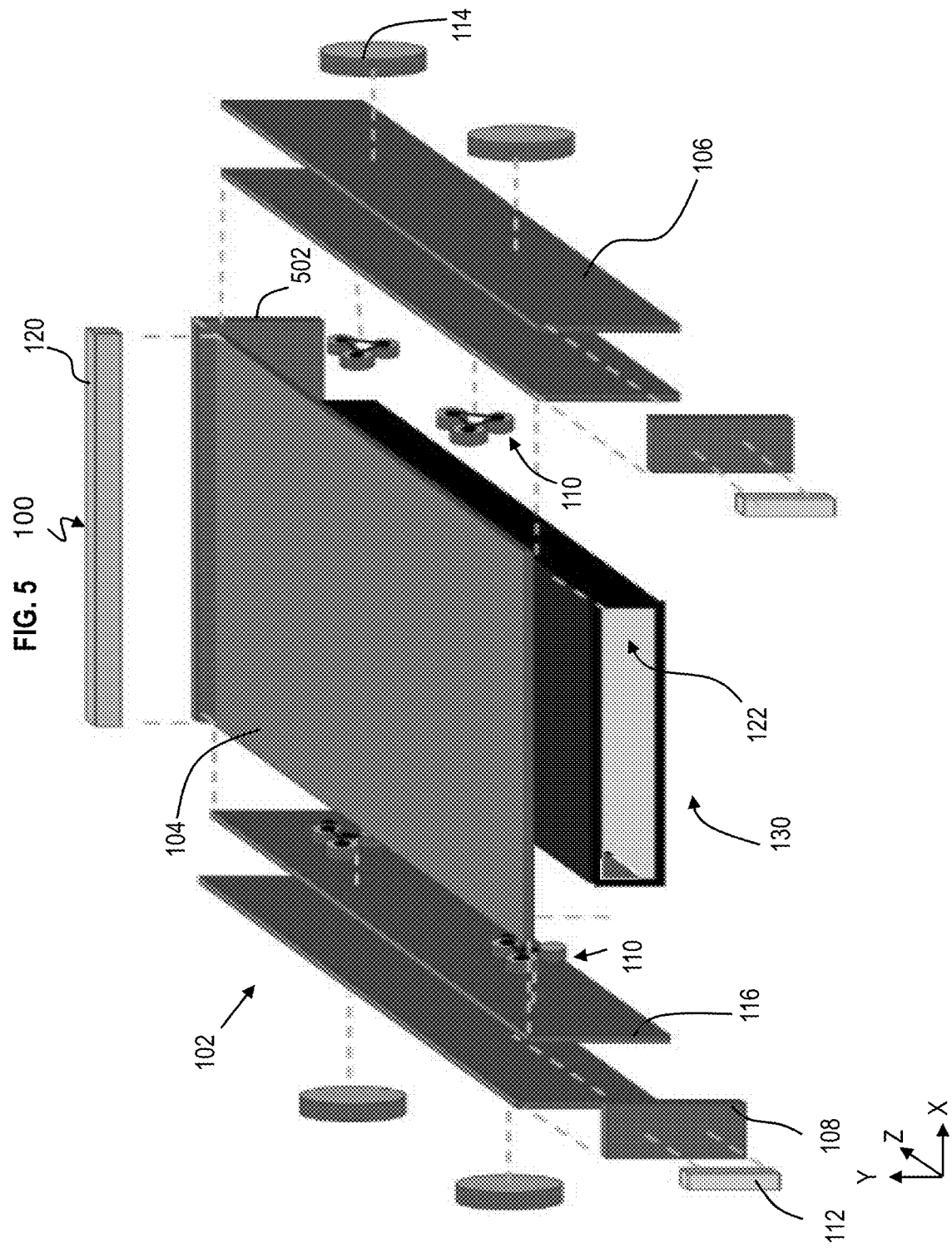
FIG. 5 depicts an exploded view of the single user truck loader in accordance with one or more embodiments of the present invention.

FIG. 5 depicts an exploded view of the single user truck loader 100 in accordance with one or more embodiments of the present invention. In this example, the exploded view shows top plate 104, (outer) sidewall plates 106, inner sidewall plates 116, front plate 502, rear plates 108, and handles 112. The exploded view also shows ramp storage 122, multiple dolly mechanisms 110 (e.g., tri-dollies), bumper edge 120, cavity 130, and wheels 114.

Figure 6:
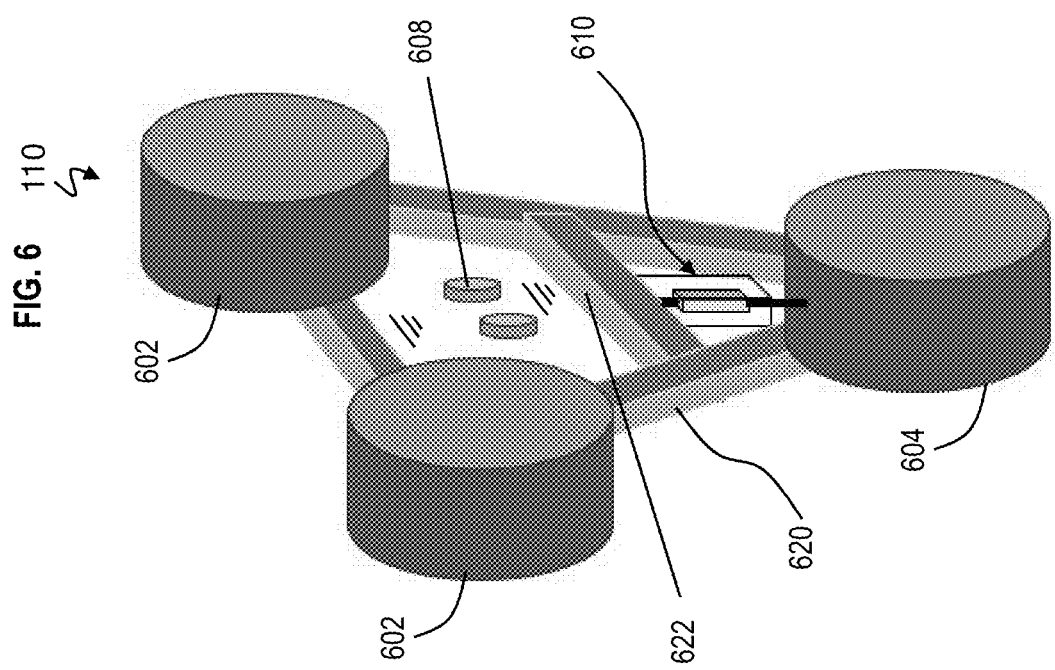
FIG. 6 depicts a perspective view of a dolly mechanism in accordance with one or more embodiments of the present invention.
Figure 7B:
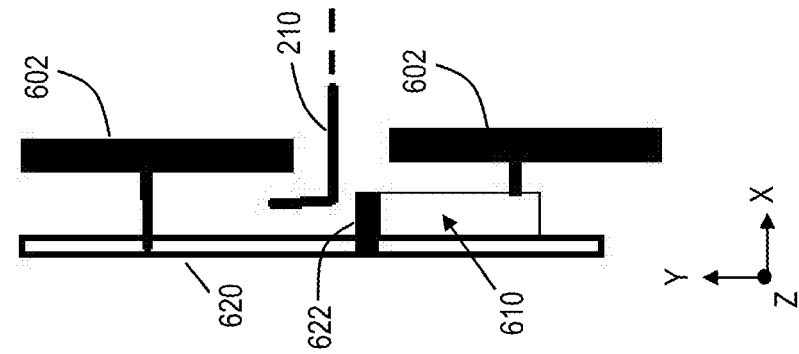
FIG. 7B depicts a side view of the diagram of the dolly mechanism in FIG. 7A in accordance with one or more embodiments of the present invention.
Figure 7A:
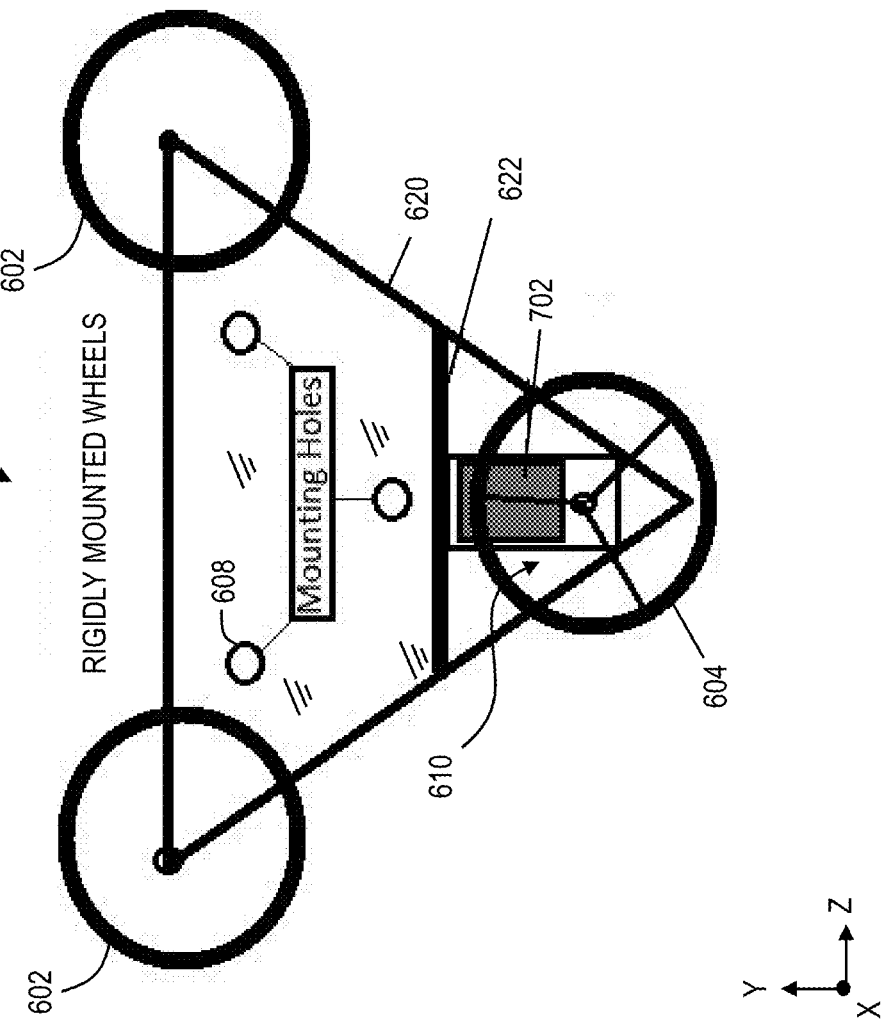
FIG. 7A depicts a diagram of dolly mechanism in accordance with one or more embodiments of the present invention.

FIG. 6 depicts a perspective view of dolly mechanism 110 as a tri-dolly mechanism in accordance with one or more embodiments of the present invention. FIG. 7A depicts a diagram of dolly mechanism 110 as a tri-dolly mechanism in accordance with one or more embodiments of the present invention. FIG. 7B depicts a side view of the diagram of the tri-dolly mechanism in FIG. 7A in accordance with one or more embodiments of the present invention. Reference can be made to FIGS. 6, 7A, and 7B while discussing further details of dolly mechanism 110.

Dolly mechanism 110 as the tri-dolly mechanism is attached to the inner surface of sidewall plate 106 and/or to inner sidewall plate 116 in one or more embodiments. Dolly mechanism 110 includes a base plate 620 or backing plate having mounting holes 608 formed therein for mounting to the sidewall plate 106 and/or to inner sidewall plate 116, using any suitable mounting techniques. Base plate 620 can be formed of any suitable material including the examples materials discussed for deck 102. Base plate 620 may be a triangular structure framed with two wheels 602 at the top and wheel 604 at the bottom. The three wheels, which are two wheels 602 and one wheel 604, are attached to base plate 620 and do not act with any other feature of deck 102. Two wheels 602 are attached on an axle to the base plate 620 (e.g., backing plate). The third wheel 604 is attached to a dampening mechanism 610 which is then attached to the base plate 620. This keeps the two wheels 602 rigidly attached to the base plate 620, while allowing the third wheel 604 to float in relationship to the two rigid wheels 602. Each of wheels 602 and 604 are configured to rotate when in contact with the lift deck 210 of the lift mechanism as the lift deck 210 is slid into and/or out of cavity 130. Dampening mechanism 610 could be attached to a support member 622 of base plate 620. Support member 622 could be a frame structure attached to base plate 620, a flange of base plate 620, etc. A portion of base plate 620 is open to accommodate dampening mechanism 610. Base plate 620 and support member 622 could be formed of any suitable material including example materials discussed herein for deck 102. Dampening mechanism 610 could be a spring dampener having a spring 702. Other examples of the dampening mechanism 610 can include a hydraulic cylinder, rubber blocks, etc. Although the lift 210 appears to be floating in the space between upper wheels 602 and lower wheel 602 of dolly mechanism 110, this is shown for illustration. Upper wheels 602 and lower wheel 602 are configured to contact lift 210 during raising and lower of deck 102, as well as during insertion of lift 210 between upper wheels 602 and lower wheel 602 and removal of lift 210.

Figure 8A:
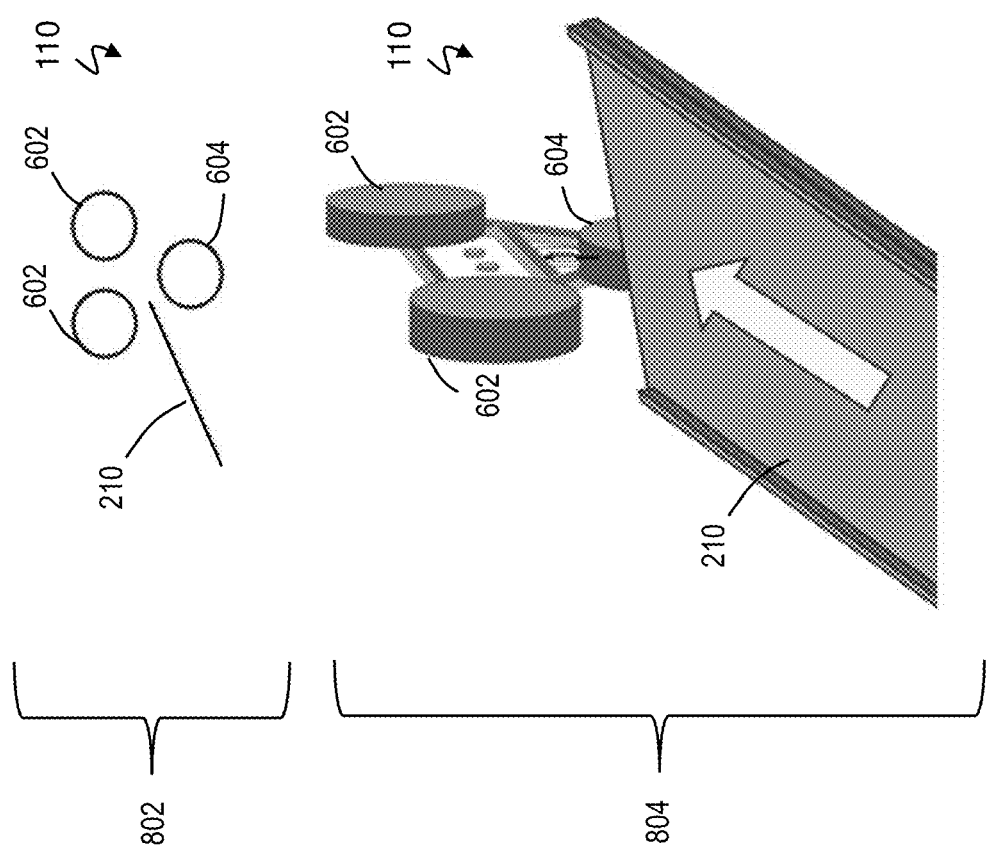
Figure 8B:
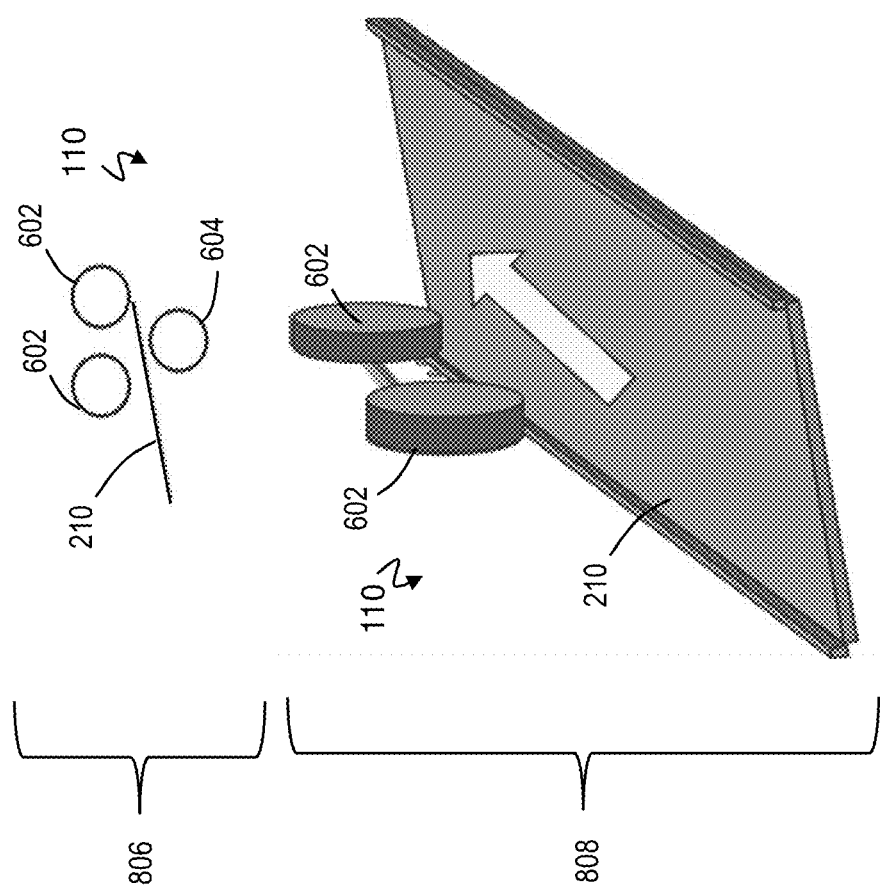
Figure 9:
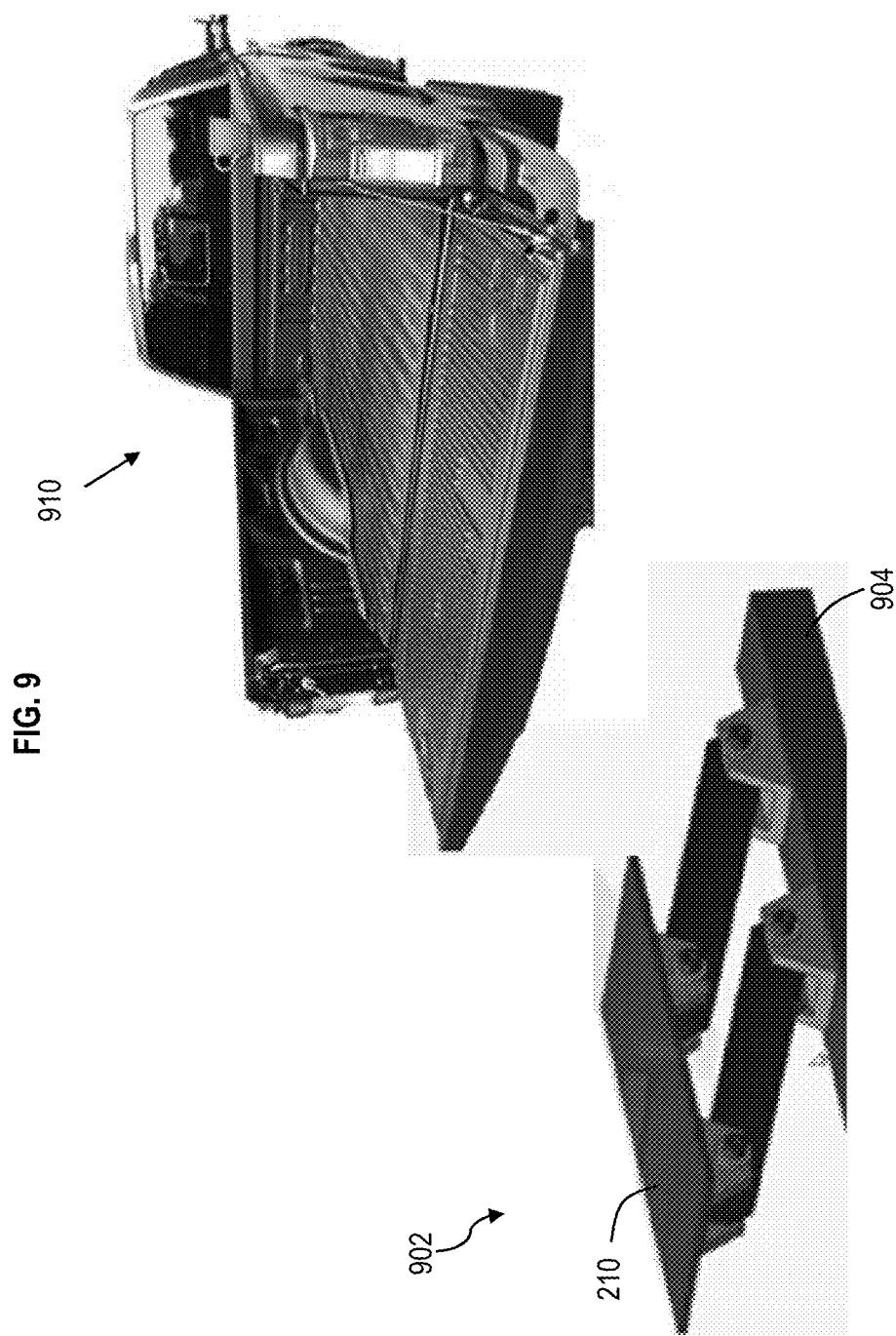
FIG. 9 depicts an example lift mechanism for raising and lowering a lift deck which in turn raises and lowers the deck of the single user truck loader in accordance with one or more embodiments of the present invention.

FIGS. 8A, 8B, and 8C depict an example scenario of dolly mechanism 110 interacting with the lift deck 210 of the lift mechanism in accordance with one or more embodiments. For conciseness and simplicity, FIGS. 8A, 8B, 8C illustrate the example interaction of a single dolly mechanism 110 with lift deck 210 but it should be appreciated that multiple dolly mechanisms 110 are arranged in cavity 130 to each accommodate lift deck 210 as discussed herein. The dolly mechanisms 110 are positioned in pairs to simultaneously control movement of lift deck 210, such that each pair is on an opposite side of lift deck 210 but only one of the pair is illustrated. In this example scenario, the lift deck 210 can be slid into place to lift/raise or lower the deck 102, and/or the lift deck 210 can be slid into place for storage in the cavity 130 of deck 102. For explanation purposes and not limitation, FIG. 9 depicts an example lift mechanism 902 with a two bar linkage for raising and lowering the lift deck 210 which in turn raises and lowers deck 102 (not shown in FIG. 9). The deck 102 can be raised and placed on vehicle 910 or removed from the bed of vehicle 910 using lift mechanism 902. The two-bar linkage operatively connects the lift deck 210 to the base 904 of lift mechanism 902. The lift deck 210 can be raised and lowered using hydraulics, a motor, a hand crank, a power screw, and/or any suitable method and equipment. Although a two-bar linkage is illustrated for explanation purposes, lift mechanism 902 is not meant to be limited. Lift mechanism 902 could be a four-bar linkage mechanism, a power screw, and/or any suitable mechanism for lifting and lowering the lift deck 210 as understood by one of ordinary skill in the art. Although not shown, it should be appreciated that lift mechanism 902 could be a parallelogram type four-bar linkage having base 904 and lift deck 210 with an additional two support members.

Returning to FIGS. 8A, view 802 is a two-dimensional representation and view 804 is a three-dimensional representation of initially sliding/inserting lift deck 210 between the upper wheels 602 and lower wheel 604 of dolly mechanism 110 in the cavity 130 of deck 102. At times, the lift deck 210 contacts the upper wheels 602 and lower wheel 604 when initially positioning the lift deck 210. In FIG. 8B, view 806 is a two-dimensional representation and view 808 is a three-dimensional representation of further sliding the lift deck 210 between the upper wheels 602 and lower wheel 604 of dolly mechanism 110. At times, the lift deck 210 contacts the upper wheels 602 and lower wheel 604 when further positioning the lift deck 210 in views 806 and 808. In FIG. 8C, view 810 is a two-dimensional representation and view 812 is a three-dimensional representation of the completion of inserting the lift deck 210 between the upper wheels 602 and lower wheel 604 of dolly mechanism 110. The lift deck 210 contacts the upper wheels 602 after the lift deck 210 is positioned in views 806 and 808. The pins 302 can secure the lift deck 210 is place for operation of lift mechanism 902. Although FIGS. 8A, 8B, 8C describe a process for loading deck 102 onto lift deck 210 for storage and/or lifting, the reverse process occurs for removing lift deck 210 of the lift mechanism 902 from deck 120.

FIG. 10 depicts examples views of deck 102 positioned on lift deck 210 for loading on the vehicle 910 in accordance with one or more embodiments. In view 1002, deck 102 has been placed on the lift deck 210 of lift mechanism 902 as discussed in FIGS. 8A, 8B, 8C. In view 1004, lift mechanism 902 raises lift deck 210 which raises deck 102. In view 1006, the height of the lift deck 210 holding deck 102 can be adjusted for the height of the truck bed, and the deck 102 starts to be moved onto the vehicle 910. View 1008 illustrates that deck 102 has been moved/pushed off lift deck 210 and onto the bed of vehicle 910. The lift mechanism 902 can be compacted and placed under the deck 102 (e.g., in the cavity 130 such that the lift deck 210 fits between the upper wheels 602 and lower wheel 604) on the bed of vehicle 910. Any tools of lift mechanism 902 can be stored in storage 122.

By analogy, deck 102 can be off-loaded or removed from the bed of vehicle 910 by performing the process in reverse depicted in FIG. 10. The lift mechanism 902 is removed from the cavity 130, and the lift deck 210 is raised to the appropriate height. To initially engage the lift deck 210 with the deck 102 for removing the deck 102 from the bed of vehicle 910, the deck 102 may be rolled to the edge of the bed and the lift deck 210 is slid/inserted between the upper wheels 602 and lower wheel 604 of deck 102 as discussed herein in FIGS. 8A, 8B, 8C. Accordingly, the process of FIG. 10 is performed in reverse.

FIG. 11 depicts examples loads or items that can be positioned on deck 102 for loading on and unloading off vehicle 910 in accordance with one or more embodiments. FIG. 11 shows various loads or items on deck 102 including a server and a crate. Ramps may be used to roll the items on the top surface of deck 102. In one or more embodiments, a hand truck can be utilized to roll a server up on a ramp onto deck 102, and the ramp can be stored in ramp storage 122 during travel. In some case, the load or item may have wheels to roll on a ramp onto deck 102. The server may be secured on deck 102 using straps, clamps, etc. Deck 102 can have multiple anchor points (not shown) for securing the sever and examples include E-Track, L-Track, D-Hooks, etc.).

FIG. 12 is a flowchart of a method 1200 for configuring an apparatus in accordance with one or more embodiments. Reference can be made to FIGS. 1-11 discussed herein. At block 1202, the method 1200 includes providing a platform (e.g., deck 102) configured to receive placement of a load (e.g., a server). At block 1204, a wheel 114 is disposed at locations (e.g., near the corners) of the platform (e.g., deck 102). At block 1206, disposing a dolly mechanism 110 in a cavity 130 formed in the platform (e.g., deck 102), sidewalls (e.g., sidewall plates 106) of the platform housing the cavity, where the cavity 130 of the platform (e.g., deck 102) is configured to receive a lift deck 210 of a lifting mechanism 902.

The platform (e.g., deck 102) is configured to slide on and off the lift deck 210 of the lifting mechanism 902. The dolly mechanism 110 is a tri-dolly mechanism. The dolly mechanism comprises wheels 602, 604. The dolly mechanism 110 includes three wheels (e.g., two upper wheels 602 and at least one lower wheel 604) disposed in a geometric arrangement. Wheels of the dolly mechanism are configured to receive the lift deck 210 of the lifting mechanism 902. Wheels 602, 604 of the dolly mechanism 110 are configured to (physically) contact the lift deck 210 of the lifting mechanism 902. The dolly mechanism includes an arrangement of wheels, such that at least one of the wheels 602 is configured to be positioned above the lift deck 210 of the lifting mechanism 902 and at least another one of the wheels 604 is configured to be positioned below the lift deck 210.

FIG. 13 is a flowchart of a method 1300 for using an apparatus (e.g., single user truck loader 100) in accordance with one or more embodiments of the invention. Reference can be made to FIGS. 1-12 discussed herein. At block 1302, method 1300 includes using a dolly mechanism 110 of a platform (e.g., deck 102) to engage a lift deck 210 of a lifting mechanism (e.g., lifting mechanism 902), the dolly mechanism being disposed in a cavity 130 formed in the platform (e.g., deck 102). At block 1304, method 1300 includes raising the platform (e.g., deck 102) to a height of a receiving surface (e.g., the bed of a truck, a loading dock of facility, etc.) by using the lift deck 210 of the lifting mechanism (e.g., lifting mechanism 902). At block 1306, method 1300 includes transferring (e.g., pushing, pulling, etc.) the platform (e.g., deck 102) from the lift deck 210 to the receiving surface by disengaging the lift deck 210 from the dolly mechanism 110.

The platform (e.g., deck 102) is configured to slide on and off the lift deck of the lifting mechanism, thereby engaging and disengaging the lift deck 210. The platform is configured for a single user to perform the using, the raising, and the transferring.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. An apparatus comprising:
   a platform configured to receive placement of a load;
   wheels disposed at locations of the platform; and
   a dolly mechanism disposed in a cavity formed in the platform, sidewalls of the platform housing the cavity, wherein the cavity of the platform is configured to receive a lift deck of a lifting mechanism, wherein the dolly mechanism comprises an arrangement of dolly wheels, such that at least one of the dolly wheels is configured to be positioned above the lift deck of the lifting mechanism and at least another one of the dolly wheels is configured to be positioned below the lift deck.

2. The apparatus of claim 1, wherein the platform is configured to slide on and off the lift deck of the lifting mechanism.

3. The apparatus of claim 1, wherein the dolly mechanism is a tri-dolly mechanism.

4. The apparatus of claim 1, wherein the dolly mechanism comprises dolly wheels.

5. The apparatus of claim 1, wherein the dolly mechanism comprises three dolly wheels disposed in a geometric arrangement.

6. The apparatus of claim 1, wherein dolly wheels of the dolly mechanism are configured to receive the lift deck of the lifting mechanism.

7. The apparatus of claim 1, wherein dolly wheels of the dolly mechanism are configured to contact the lift deck of the lifting mechanism.

8. A method of configuring an apparatus, the method comprising:
   providing a platform configured to receive placement of a load;
   disposing wheels at locations of the platform; and disposing a dolly mechanism in a cavity formed in the platform, sidewalls of the platform housing the cavity, wherein the cavity of the platform is configured to receive a lift deck of a lifting mechanism, wherein the dolly mechanism comprises an arrangement of dolly wheels, such that at least one of the dolly wheels is configured to be positioned above the lift deck of the lifting mechanism and at least another one of the dolly wheels is configured to be positioned below the lift deck.

9. The method of claim 8, wherein the platform is configured to slide on and off the lift deck of the lifting mechanism.

10. The method of claim 8, wherein the dolly mechanism is a tri-dolly mechanism.

11. The method of claim 8, wherein the dolly mechanism comprises dolly wheels.

12. The method of claim 8, wherein the dolly mechanism comprises three dolly wheels disposed in a geometric arrangement.

13. The method of claim 8, wherein dolly wheels of the dolly mechanism are configured to receive the lift deck of the lifting mechanism.

14. A method comprising:
using a dolly mechanism of a platform to engage a lift deck of a lifting mechanism, the dolly mechanism being disposed in a cavity formed in the platform;
raising the platform to a height of a receiving surface by using the lift deck of the lifting mechanism; and
transferring the platform from the lift deck to the receiving surface by disengaging the lift deck from the dolly mechanism, wherein the dolly mechanism comprises an arrangement of dolly wheels, such that at least one of the dolly wheels is configured to be positioned above the lift deck of the lifting mechanism and at least another one of the dolly wheels is configured to be positioned below the lift deck.

15. The method of claim 14, wherein the platform is configured to slide on and off the lift deck of the lifting mechanism.

16. The method of claim 14, wherein the dolly mechanism is a tri-dolly mechanism.

17. The method of claim 14, wherein the dolly mechanism comprises dolly wheels.

18. The method of claim 14, wherein platform is configured for a single user to perform the using, the raising, and the transferring.

* * * * *